US008531506B2

(12) United States Patent
Wang et al.

(10) Patent No.: US 8,531,506 B2
(45) Date of Patent: Sep. 10, 2013

(54) INTERACTIVE STEREO DISPLAY SYSTEM AND METHOD FOR CALCULATING THREE-DIMENSIONAL COORDINATE

(75) Inventors: Guo-Zhen Wang, Taichung (TW); Shuan-Yu Tung, Pingtung County (TW); Ming-Ching Ma, Yunlin County (TW); Yi-Pai Huang, Chiayi (TW); Shu-Wen Tzeng, Changhua County (TW); Hung-Wei Tseng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 316 days.

(21) Appl. No.: 13/117,131

(22) Filed: May 26, 2011

(65) Prior Publication Data

US 2012/0218390 A1   Aug. 30, 2012

(30) Foreign Application Priority Data

Feb. 24, 2011   (TW) .............................. 100106238 A (51) Int. Cl.
*H04N 13/04*   (2006.01)
(52) U.S. Cl.
USPC .......................................................... 348/51
(58) Field of Classification Search
USPC .......................................................... 348/51
See application file for complete search history.

(56) References Cited

U.S. PATENT DOCUMENTS

| 5,446,801 | A | * | 8/1995 | Itsuzaki et al. ................. 382/141 |
| 6,005,987 | A | * | 12/1999 | Nakamura et al. ............ 382/294 |
| 6,021,222 | A | * | 2/2000 | Yamagata ..................... 382/199 |
| 6,554,434 | B2 | * | 4/2003 | Sciammarella et al. ........ 353/98 |
| 6,791,700 | B2 | | 9/2004 | Omura et al. |
| 7,009,713 | B2 | * | 3/2006 | Seko et al. .................... 356/498 |
| 7,701,589 | B2 | | 4/2010 | Takeda et al. |
| 7,812,940 | B2 | | 10/2010 | Daigle |
| 8,115,992 | B2 | * | 2/2012 | Brueck et al. ................. 359/385 |
| 8,269,750 | B2 | * | 9/2012 | Li et al. ......................... 345/175 |
| 8,289,300 | B2 | * | 10/2012 | Keam ............................ 345/175 |
| 2007/0036397 | A1 | * | 2/2007 | Hamza .......................... 382/117 |
| 2008/0150913 | A1 | | 6/2008 | Bell et al. |
| 2008/0231742 | A1 | * | 9/2008 | Kurase ..................... 348/333.01 |
| 2009/0091554 | A1 | * | 4/2009 | Keam ............................ 345/175 |
| 2009/0262075 | A1 | * | 10/2009 | Kimmel et al. ............... 345/163 |
| 2010/0328200 | A1 | * | 12/2010 | Yu et al. ........................ 345/156 |
| 2012/0098746 | A1 | * | 4/2012 | Ogawa .......................... 345/158 |
| 2012/0146953 | A1 | * | 6/2012 | Yi et al. ........................ 345/175 |

* cited by examiner

*Primary Examiner* — David Czekaj
*Assistant Examiner* — Leron Beck
(74) *Attorney, Agent, or Firm* — Jianq Chyun IP Office (57) ABSTRACT

An interactive stereo display system and a method for calculating a three-dimensional (3D) coordinate are provided. The interactive stereo display system includes a plurality of interactive devices, a stereo display panel, and a processing unit. When the stereo display panel is irradiated by a light radiated from a light source of each interactive device, an image of each light filtered by a color filter is captured by an in-cell type optical sensor array. After receiving the images, the processing unit determines overlapping circle objects in each image and identifies the circle object formed by each light source according to a light intensity value at the center of each circle objects. Accordingly, the 3D coordinate of each interactive device relative to the stereo display panel can be calculated according to the center and a radius of each circle object corresponding to each light source.

15 Claims, 8 Drawing Sheets

| | Non-overlapping light sources | | | Overlapping light sources |
|---|---|---|---|---|
| | Red light source: 0cm<br>Blue light source: 5cm | Red light source: 5cm<br>Blue light source: 0cm | Red light source: 3cm<br>Blue light source: 3cm | Red light source: 2cm<br>Blue light source: 2cm |
| Red light image obtained by filtering the red light source | | | | |
| Blue light image obtained by filtering the blue light source | | | | |
| Red light image: circle detection | | | | |
| Blue light image: circle detection | | | | |
| Circle object corresponding to the red light source | | | | |
| Circle object corresponding to the blue light source | | | | |
| Center and radius | Red light source: (30,39), r=4<br>Blue light source: (36,31), r=19 | Red light source: (41,38), r=14<br>Blue light source: (26,81), r=4 | Red light source: (50,81), r=12<br>Blue light source: (30,47), r=16 | Red light source: (32,102), r=7<br>Blue light source: (22,98), r=13 |
| 3D coordinate | Red light source: (30,39,0 cm)<br>Blue light source: (36,31,5 cm) | Red light source: (41,38,5 cm)<br>Blue light source: (26,81,0 cm) | Red light source: (50,81,3 cm)<br>Blue light source: (30,47,3 cm) | Red light source: (32,102,2 cm)<br>Blue light source: (22,98,2 cm) |

INTERACTIVE STEREO DISPLAY SYSTEM AND METHOD FOR CALCULATING THREE-DIMENSIONAL COORDINATE

CROSS-REFERENCE TO RELATED APPLICATION

This application claims the priority benefit of Taiwan application serial no. 100106238, filed on Feb. 24, 2011. The entirety of the above-mentioned patent application is hereby incorporated by reference herein and made a part of this specification.

BACKGROUND

1. Technical Field The description relates to a stereo display system and in particular to an interactive stereo display system.

2. Description of Related Art

In recent years, as display technology advances, users have become more and more demanding on display quality, e.g., image resolution, color saturation, and so forth. In addition to high resolution and high color saturation, displays which are capable of displaying stereo images have been developed in order to satisfy the need of users to view realistic images. As current stereo display technology continues to advance, it is foreseeable that real-time interaction between the user and stereo images will become the trend of human-machine interaction in next generation.

Currently, an interactive stereo display device interacts with the user by capturing the three-dimensional (3D) spatial position of the user, so as to synchronize the user's position and the displayed image. According to the existing 3D interactive technology, image data are often obtained by video cameras and analyzed to obtain space data, which can ensure the quality of the image and accomplish the multi-touch function. However, due to the increase in the volume of the entire equipment, the conventional 3D interactive technology can be merely applied to systems with large size and volume. Besides, the viewing angle limitation of the video cameras results in the unlikelihood of obtaining the images within a range close to the video cameras, and thus the 3D interactive technology cannot be normally applied.

Another common interactive device requires the user to be equipped with additional devices to achieve interaction. For instance, the user may wear a pair of gloves with gyro meters for locating the users. In addition, 3D interaction can be achieved by utilizing infrared signals. Nonetheless, said technology is often subject to calibration of the devices once the devices are used. The additional devices also cause inconvenience to the users and are likely to be stolen when the devices are placed in public places.

Aside from the above, another common 3D interaction technology is directed to the use of optics sensors which can be integrated into displays during the manufacturing process without increasing the volume of the entire equipment. Besides, the optics sensors are embedded into the displays, such that the video cameras are no longer unable to detect images when approaching the displays. Thereby, the two-dimension (2D) touch actions on the display panels and the 3D touch actions above the display panels are indiscrete and smooth. Even so, the existing 3D interactive technology utilizing the optics sensors cannot achieve the multi-touch function.

SUMMARY

The embodiment is directed to a method for calculating a 3D coordinate. By applying the method, circle objects resulting from different light sources can be identified, and precision of the 3D coordinate can be further improved.

The embodiment is further directed to an interactive stereo display system that can achieve the multi-touch function by means of a plurality of interactive devices.

In an embodiment, a method for calculating a 3D coordinate is provided. The method is suitable for calculating 3D coordinates of a first interactive device and a second interactive device relative to a stereo display panel. The first interactive device includes a first light source that radiates a first light, and the second interactive device includes a second light source that radiates a second light. The stereo display panel includes a color filter and an optical sensor array. The method for calculating the 3D coordinate at least includes following steps. The stereo display panel is irradiated by the first light radiated by the first light source and the second light radiated by the second light source. A first image is obtained by capturing the first light filtered by the color filter, and a second image is obtained by capturing the second light filtered by the color filter. Here, the first light and the second light that are filtered by the color filter are captured by the optical sensor array. At least one circle object in the first image and at least one circle object in the second image are detected to obtain a center coordinate and a radius of each of the circle objects in the first image and in the second image, respectively. Whether overlapping circle objects among the circle object in the first image and the circle object in the second image exist is determined according to relative positions of the center coordinates. A light intensity value at a center of each of the circle objects is detected. The overlapping circle objects among the circle object in the first image and the circle object in the second image formed by the first light source or by the second light source is determined according to the light intensity value at the center of each of the circle objects. The 3D coordinates of the first interactive device and the second interactive device relative to the stereo display panel are calculated according to the center coordinate and the radius of each of the circle objects respectively corresponding to the first light source and the second light source.

According to an embodiment, the step of detecting the at least one circle object in the first image and the at least one circle object in the second image includes detecting the at least one circle object in the first image and the at least one circle object in the second image by Hough transformation, so as to obtain the center coordinate and the radius of each of the circle objects in the first image and in the second image respectively.

According to an embodiment, in the method for calculating the 3D coordinate, when the first image includes a first circle object, and the second image includes a second circle object and a third circle object, a first distance between the first circle object and the second circle object and a second distance between the first circle object and the third circle object are calculated according to the center coordinate of each of the circle objects. If the first distance is shorter than the second distance, the first circle object and the second circle object are confirmed to be overlapped. If the second distance is shorter than the first distance, the first circle object and the third circle object are confirmed to be overlapped.

According to an embodiment, in the step of determining the overlapping circle objects among the circle object in the first image and the circle object in the second image formed by the first light source or by the second light source, if the largest light intensity value among the light intensity values of the overlapping circle objects is detected at the center of the circle object in the first image, the overlapping circle objects are conformed to be formed by the first light source, and the circle object in the first image is set as corresponding to the first light source; if the largest light intensity value among the light intensity values of the overlapping circle objects is detected at the center of the circle object in the second image, the overlapping circle objects of the circle objects are confirmed to be formed by the second light source, and the circle object in the second image is set as corresponding to the second light source.

According to an embodiment, in the step of calculating the 3D coordinates of the first interactive device and the second interactive device relative to the stereo display panel, a database is searched according to the radius of each of the circle objects respectively corresponding to the first light source and the second light source to obtain a height coordinate corresponding to the radius, and the 3D coordinates of the first interactive device and the second interactive device relative to the stereo display panel are generated according to the center coordinate and the height coordinate of each of the circle objects respectively corresponding to the first light source and the second light source, so as to calculate the 3D coordinates of the first interactive device and the second interactive device relative to the stereo display panel.

In an embodiment, an interactive stereo display system that includes a first interactive device, a second interactive device, a stereo display panel, and a processing unit is provided. The first interactive device includes a first light source that radiates a first light. The second interactive device includes a second light source that radiates a second light. The stereo display panel includes a color filter and an optical sensor array. When the stereo display panel is irradiated by the first light radiated from the first light source and the second light radiated from the second light source, the optical sensor array captures the first light filtered by the color filter to obtain a first image and captures the second light filtered by the color filter to obtain a second image. The processing unit is electrically connected to the optical sensor array. Besides, the processing unit performs the above-mentioned method for calculating the 3D coordinate after receiving the first image and the second image from the optical sensor array.

According to an embodiment, the processing unit is built in the stereo display panel.

According to an embodiment, the first light source and the second light source have different light wavelengths. Besides, the first light source and the second light source respectively have an orientational pattern, such that an elliptical object having the orientational pattern is formed in the first image or the second image when the first light source or the second light source radiates light to the stereo display panel at a tilt angle. Thereby, the processing unit determines a tilt direction of the first light source or the second light source according to the orientational pattern and determines the tilt angle according to the elliptical object.

According to the above, the interactive stereo display system described in the embodiments can perform a multi-touch interactive stereo display function without changing the structure and increasing the volume of the stereo display panel. Moreover, the circle object corresponding to each light source can be identified, and thereby the distance between each of the interactive devices and the stereo display panel can be measured accurately.

In order to make the aforementioned and other features and advantages more comprehensible, several embodiments accompanied with figures are described in detail below.

BRIEF DESCRIPTION OF THE DRAWINGS

The accompanying drawings are included to provide a further understanding, and are incorporated in and constitute a part of this specification. The drawings illustrate embodiments and, together with the description, serve to explain the principles.

DESCRIPTION OF EMBODIMENTS

Figure 1:
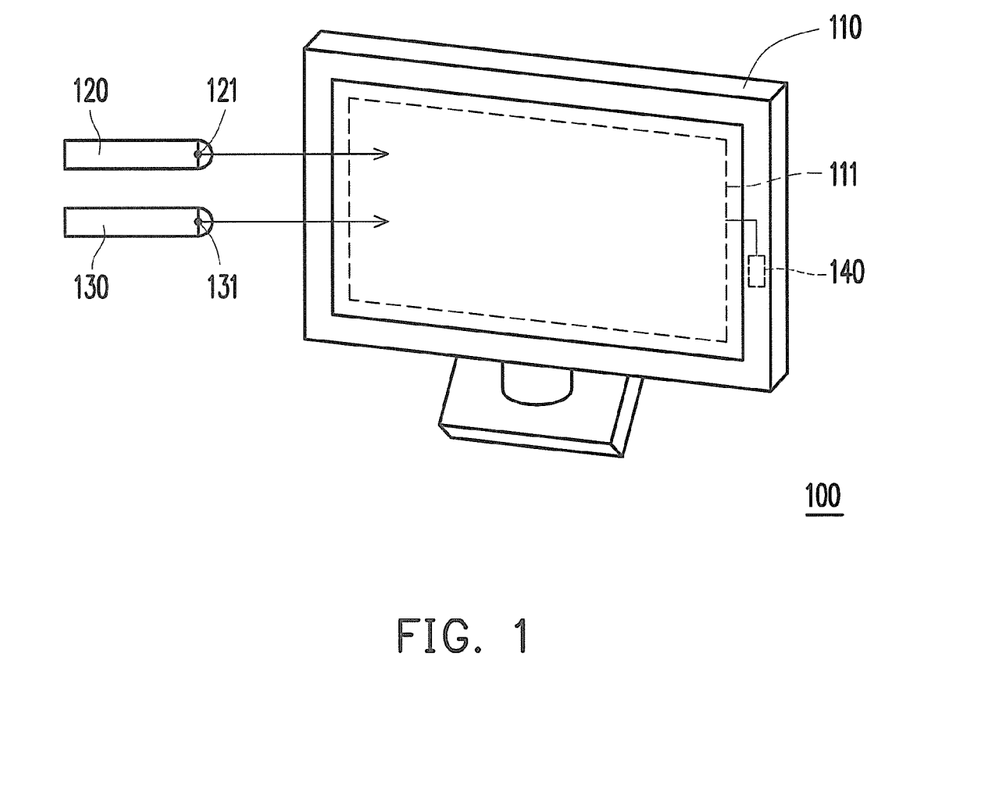
FIG. 1 is a schematic view illustrating an interactive stereo display system according to an embodiment.

FIG. 1 is a schematic view illustrating an interactive stereo display system according to an embodiment. With reference to FIG. 1, in this embodiment, the interactive stereo display system 100 includes a stereo display panel 110, a first interactive device 120, a second interactive device 130, and a processing unit 140. The processing unit 140 is built in the stereo display panel 110. In other embodiments, the interactive stereo display system 100 can further include three or more interactive devices.

The first interactive device 120 includes a first light source 121 that radiates a first light. The second interactive device 130 includes a second light source 131 that radiates a second light. Here, the first light source 121 and the second light source 131 are light emitting diodes (LEDs), laser light, or other light sources characterized by the capability of projection. Besides, the first light source 121 and the second light source 131 have different light wavelengths. The stereo display panel 110 has an in-cell or on cell type optical sensor array 111, and the processing unit 140 is electrically connected to the in-cell or on cell optical sensor array 111.

Figure 2A:
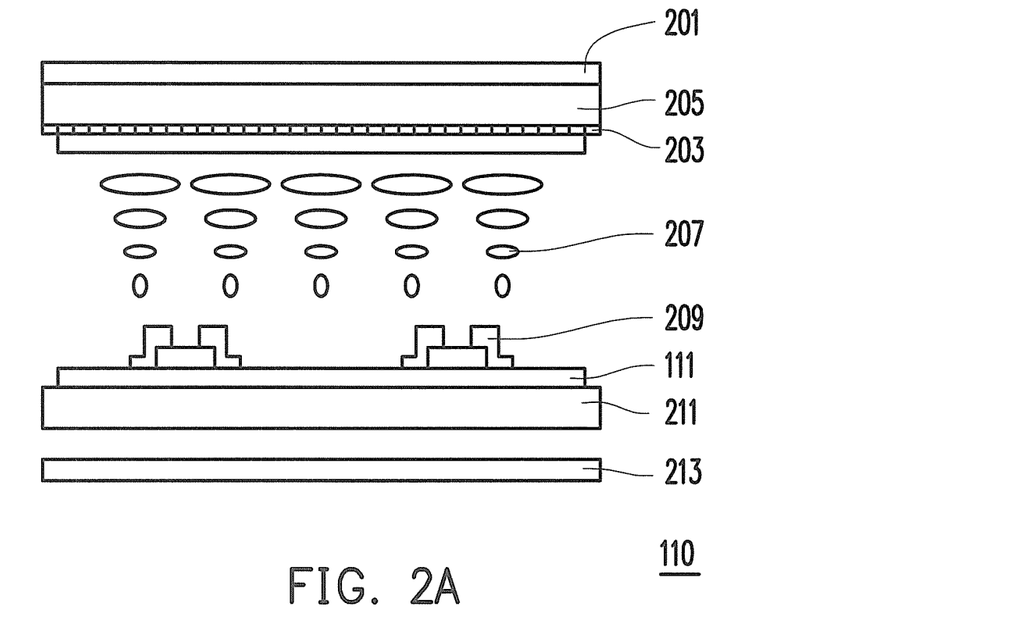
FIG. 2A and FIG. 2B are schematic views illustrating the structure of a stereo display panel according to an embodiment.
Figure 2B:
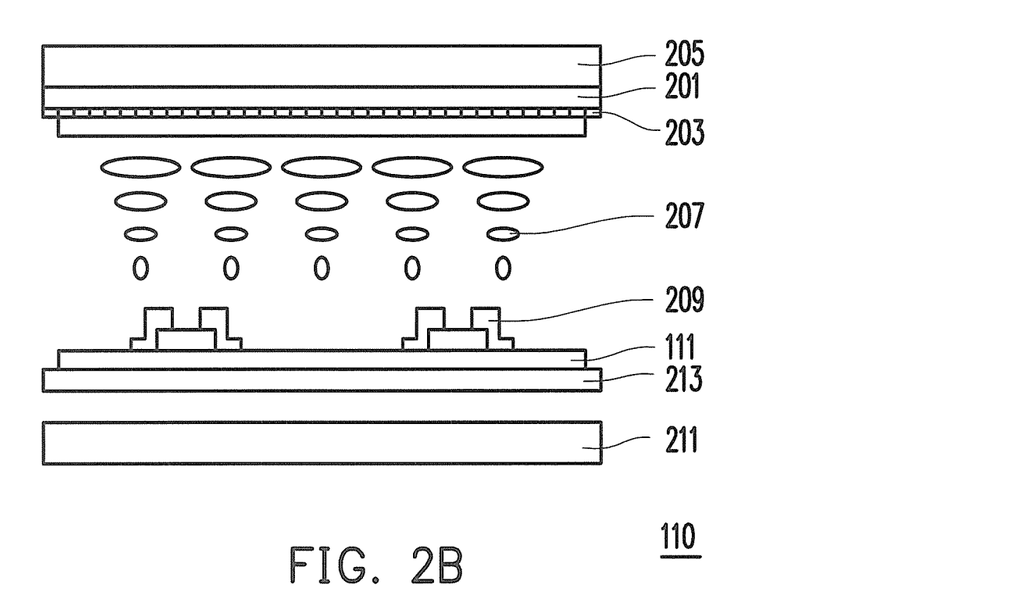

The structure of the stereo display panel is exemplified hereinafter. FIG. 2A and FIG. 2B are schematic views illustrating the structure of a stereo display panel according to an embodiment. With reference to FIG. 2A and FIG. 2B, the stereo display panel 110 includes a first polarizer 201, a color filter 203, a top substrate 205, a liquid crystal layer 207, a thin film transistor (TFT) array 209, the optical sensor array 111, a bottom substrate 211, and a second polarizer 213. The liquid crystal layer 207 is configured between the top substrate 205 and the bottom substrate 211.

As indicated in FIG. 2A, the first polarizer 201 and the second polarizer 213 are respectively configured at the outer side of the top substrate 205 and the outer side of the bottom substrate 211. In other words, the first polarizer 201 is located above the top substrate 205, and the second polarizer 213 is located below the bottom substrate 211. The color filter 203 is configured below the top substrate 205. The liquid crystal layer 207 is located between the color filter 203 and the TFT array 209. The optical sensor array 111 is located between the TFT array 209 and the bottom substrate 211. The TFT array 209 is located above the optical sensor array 111. By contrast, as indicated in FIG. 2B, the first polarizer 201 and the second polarizer 213 are respectively configured at the inner side of the top substrate 205 and the inner side of the bottom substrate 211. In other words, the first polarizer 201 is located below the top substrate 205, and the second polarizer 213 is located above the bottom substrate 211. The color filter 203 is configured below the first polarizer 201. The liquid crystal layer 207 is located between the color filter 203 and the TFT array 209. The optical sensor array 111 is located between the TFT array 209 and the second polarizer 213. The TFT array 209 is located above the optical sensor array 111. Here, the TFT array 209 and the optical sensor array 111 can be formed in the same layer by performing a series of manufacturing processes.

Here, the stereo display panel 110 is an in-cell type optical sensor array 111 and has the color filter 203. The color filter 203 includes a plurality of color filter films (e.g., red, green, and blue filter films). The optical sensor array 111 includes a plurality of sensing devices, and each of the color filter films corresponds to one of the sensing devices, respectively. When the stereo display panel 110 is irradiated by light sources with different colors, the optical sensor array 111 detects an image on which multiple light sources are distributed. The color filter 203 having the blue, green, and red filter films is taken for example. The sensing devices corresponding to the color filter films with the same color are considered as a group. When light beams from multiple light sources pass through the color filter 203, three images respectively generated by the light beams passing through the color filter films with different colors can be obtained. Besides, since the light beams passing through the color filter films with different colors have different light wavelengths, the intensity of light from the light sources with different colors varies when the light beams pass through the color filter films with different colors.

In this embodiment, the in-cell or on cell optical sensor array 111 captures a plurality of light beams passing through the color filter 203 to obtain a plurality of images. According to the images, the processing unit 140 can calculate the relative positions of the stereo display panel 110 and the interactive devices that radiate the light beams respectively from the light sources. Specifically, in the exemplary color filter 203 having the blue, green, and red filter films, the sensing devices corresponding to the blue, green, and red filter films respectively capture images with three different wavelengths. After the processing unit 140 receives the images, background signals and noises can be removed to obtain clear light source images. A circle detection process is then performed to detect a circle object in each of the images, so as to obtain the center and the radius of each circle object, confirm whether the circle objects are overlapped, and identify the correct light sources to which the circle objects correspond. Thereby, the processing unit 140 can obtain the circle objects corresponding to different light sources. Besides, according to the center location and the radius of each of the circle objects, the processing unit 140 calculates the 3D coordinates of the interactive devices (e.g., the first interactive device 120 and the second interactive device 130) relative to the stereo display panel 110. Here, the interactive devices radiate the light emitted from different light sources.

In practice, users can wear different interactive devices on different fingers, and the interactive devices respectively have the light sources with different colors. Since the light passing through the color filter films with different colors has different wavelengths, when the light emitted from different light sources passes through the color filter 203, the optical sensor array 111 detects different light intensities of the images, and the light source images corresponding to the interactive devices on different fingers can be captured according to the difference in the light intensities detected by the optical sensor array 111. Moreover, when the light sources are located at different heights, the shape and the dimension of the light source images vary accordingly. The 3D location information containing the location, the height, and the angle can be obtained according to image variations.

Figure 3:
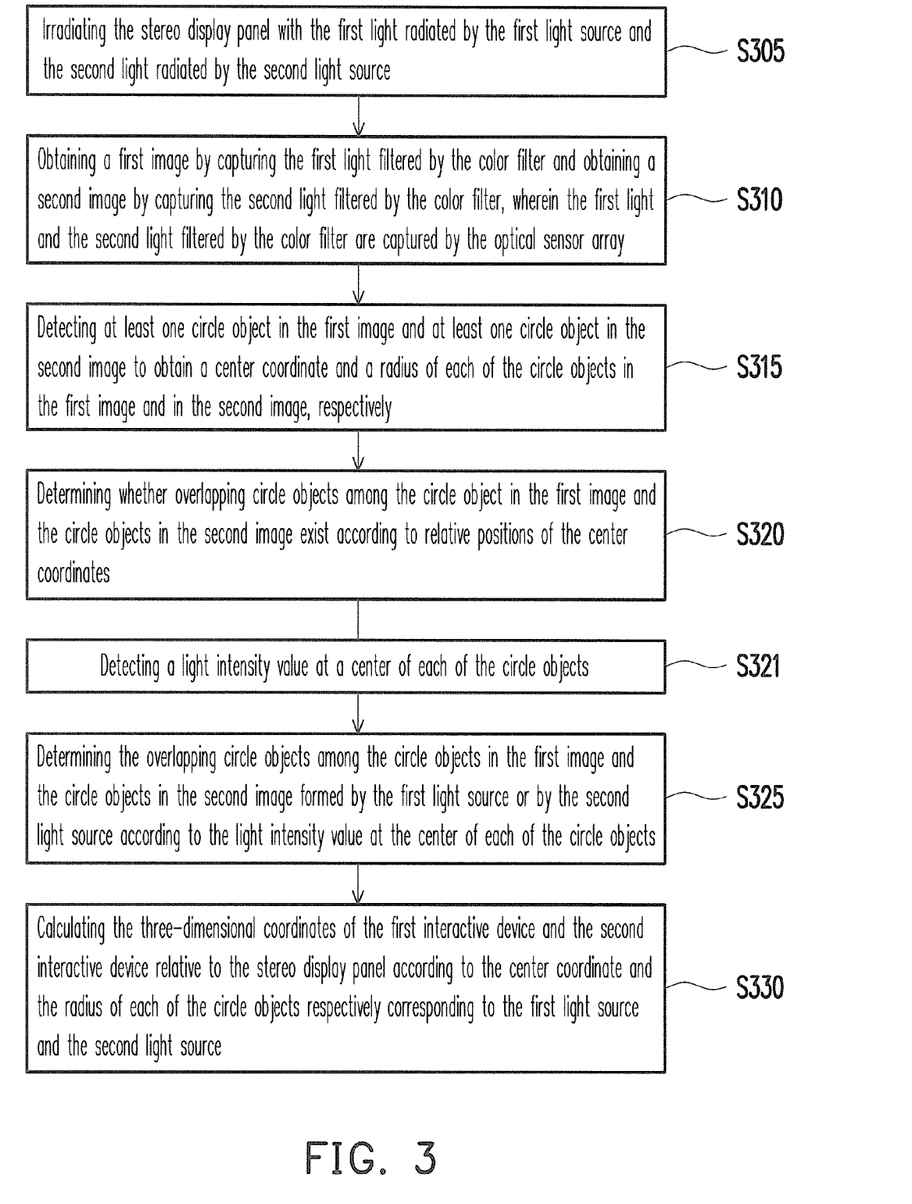
FIG. 3 is a flowchart of a method for calculating a 3D coordinate according to an embodiment.

The stereo display system 100 is taken below to elaborate the method for calculating the 3D coordinates of the interactive devices relative to the stereo display panel. FIG. 3 is a flowchart of a method for calculating a 3D coordinate according to an embodiment. To better elaborate the embodiment, two interactive devices, i.e., the first and second interactive devices 120 and 130, are exemplified hereinafter.

In step S305, the stereo display panel 110 is irradiated by the first light radiated from the first light source 121 and the second light radiated from the second light source 131. In step S310, a first image is obtained by capturing the first light filtered by the color filter 203, and a second image is obtained by capturing the second light filtered by the color filter 203. Here, the first light and the second light that are filtered by the color filter 203 are captured by the optical sensor array 111.

In step S315, the processing unit 140 detects circle objects in the first image and the second image respectively to obtain a center coordinate and a radius of each of the circle objects in the first image and the second image. For instance, the circle objects in the first image and the second image are detected by Hough transformation, so as to obtain the center coordinate and the radius of each of the circle objects. According to the Hough transformation, dots in the image space are processed in the parameter space.

Figure 4A:
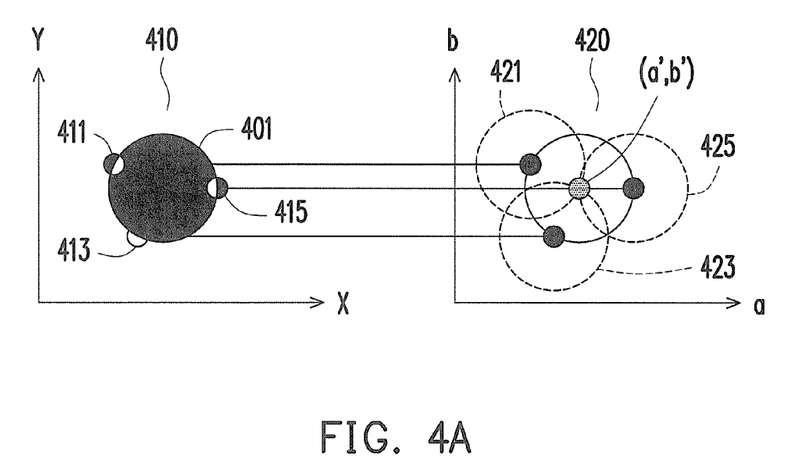
FIG. 4A and FIG. 4B are schematic views illustrating that circle objects are detected by Hough transformation.
Figure 4B:
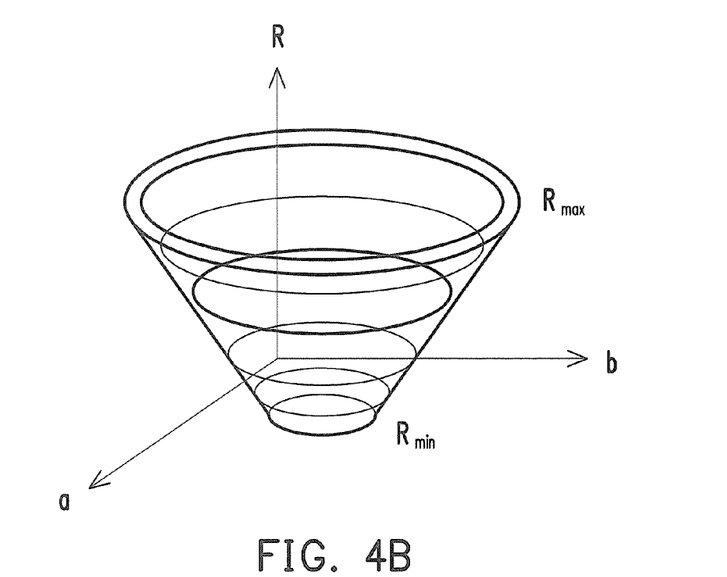

For instance, please refer to FIG. 4A and FIG. 4B which are schematic views illustrating that the circle objects are detected by Hough transformation. As shown in FIG. 4A, the dots in the image space 410 are processed in the parameter space 420. If two dots in the image space 410 are located on the trajectory of the same circle, two circles in the parameter space 420 which correspond to the two dots intersect at one point.

A center coordinate of the circle in the image space 410 is (a, b), and the circle having the radius R can be represented by the following equation:

$$\begin{cases} x = a + R\cos\theta \\ y = b + R\sin\theta \end{cases}$$

In the parameter space 420, the center coordinate (a, b) is represented by the following equation:

$$\begin{cases} a = x - R\cos\theta \\ b = y - R\sin\theta \end{cases}$$

Accordingly, each dot on the circle in the image space 410 is transformed into a circle in the parameter space 420. The center coordinates of the circles in the parameter space 420 are all (x, y), and each of the radii of the circles are R. The circles 421, 423, and 425 in the parameter space 420 have a plurality of intersection points, and the intersection point at which most circles are intersected is the center of the circle in the image space 410. For instance, dots 411, 413, and 415 on the trajectory of the circle 401 in the image space 410 are respectively transformed into the circles 421, 423, and 425 in the parameter space 420. The point (a', b') at which the circles 421, 423, and 425 are intersected is the center coordinate of the circle 401 in the image space 410.

In order to detect the circle object with an unknown radius, the parameter R can be considered as another coordinate (other than coordinate a and coordinate b) in the parameter space 420. Thereby, each dot on the circle 401 in the image space 410 constitutes a cone-shaped plane, as indicated in FIG. 4B. As long as the point at which most circles are intersected is calculated when different parameters R are given (e.g., the radius is determined to fall within the range of $R_{min} \sim R_{max}$), the center coordinate and the radius of each circle object can be obtained.

As indicated in FIG. 3, after the center coordinate and the radius of each circle object are obtained, overlapping circle objects in the first and second images are determined according to relative positions of the center coordinates in step S320. Namely, the circle objects formed by the same light source in the first and second images are identified.

According to the existing technology, the light sources with other wavelengths cannot be completely filtered by the color filter films in the color filter 203, and therefore the images detected by the optical sensor array 111 may include shadows caused by two different light sources. Namely, the circle objects formed by the same light source in the first and second images need to be identified. For instance, when the first image includes a first circle object, and the second image includes a second circle object and a third circle object, a first distance between the first circle object and the second circle object and a second distance between the first circle object and the third circle object are calculated according to the center coordinate of each of the circle objects. If the first distance is shorter than the second distance, the first circle object and the second circle object are confirmed to be overlapped. That is to say, the first and second circle objects are determined to be formed by the same light source. If the second distance is shorter than the first distance, the first circle object and the third circle object are conformed to be overlapped. That is to say, the first and third circle objects are determined to be formed by the same light source.

In other embodiments, given the first and second images respectively include two or more circle objects, one of the circle objects in the first image is taken, and the distances between the circle object taken from the first image and the circle objects in the second image are respectively calculated, so as to detect the circle object formed by the same light source. Another one of the circle objects in the first image is then taken, and the distances between the circle object taken from the first image and the circle objects in the second image are respectively calculated.

Figure 5:
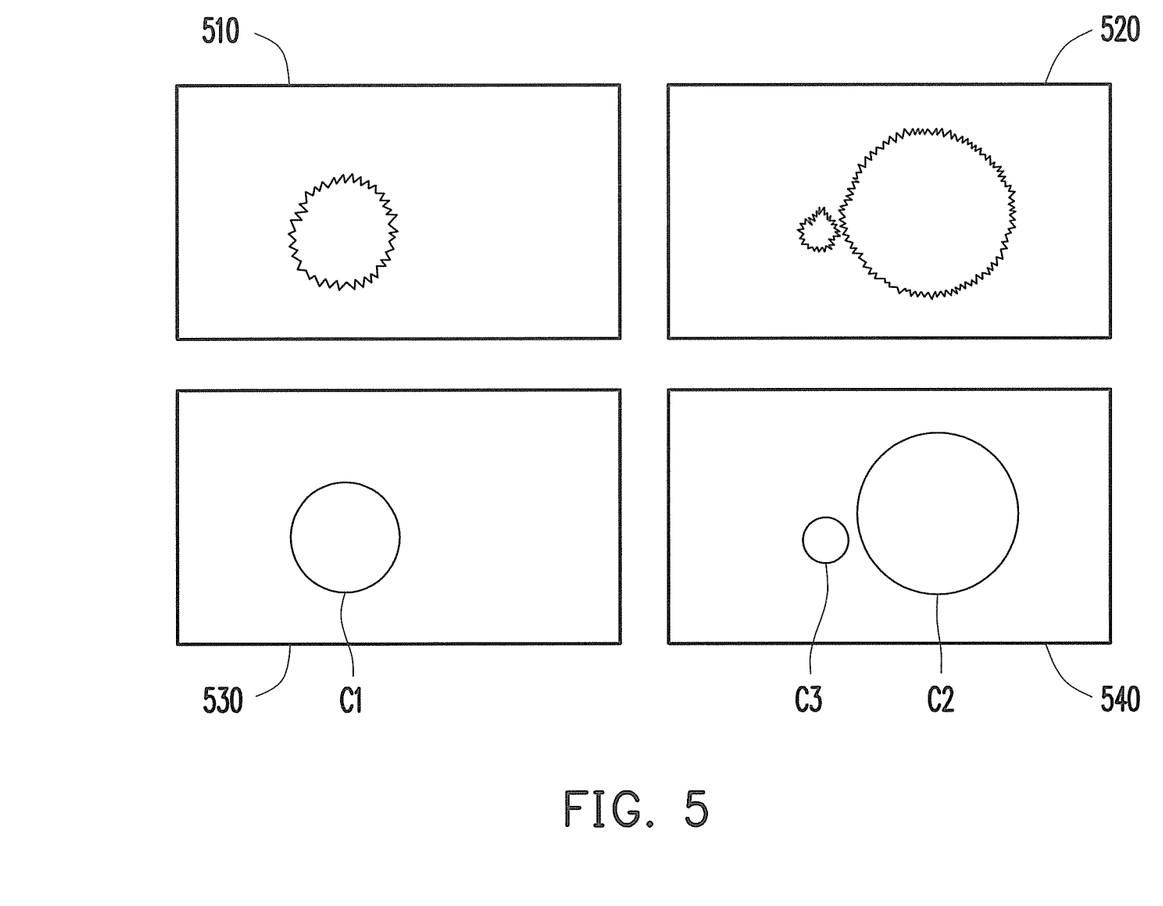
FIG. 5 is a schematic view illustrating images obtained by Hough transformation.

The way to determine the circle objects formed by the same light source is described in the following embodiment. FIG. 5 is a schematic view illustrating images obtained by Hough transformation. With reference to FIG. 1, FIG. 2, and FIG. 5, in this embodiment, the first light source 121 radiates red light, and the second light source 131 radiates blue light. The red light is filtered by the color filter 203 to obtain a first image 510, and the blue light is filtered by the color filter 203 to obtain a second image 520. The optical sensor array 111 captures the first image 510 (the red light image) and captures the second image 520 (the blue light image). The first and second images 510 and 520 in FIG. 5 then become the images 530 and 540 after the circle objects are detected. The circle object C1 in the image 530 is detected, and the circle object C2 and the circle object C3 in the image 540 are detected.

The first distance between the circle object C1 and the circle object C2 and the second distance between the circle object C1 and the circle object C3 are calculated according to the center coordinate of each of the circle objects. Since the second distance between the circle object C1 and the circle object C3 is shorter than the first distance between the circle object C1 and the circle object C2, the circle objects C1 and C3 are determined to be formed by the same light source.

Next, as indicated in FIG. 3, in step S321, a light intensity value at the center of each of the circle objects is detected. In step S325, the overlapping circle objects in the first image and the second image formed by the first light source or by the second light source is determined according to the light intensity value at the center of each of the circle objects. If the light intensity value at the center of the circle object in the first image is the largest one among the light intensity values at the centers of the overlapping circle objects, the overlapping circle objects in the first image and the second image are determined to be formed by the first light source, and the circle object in the first image is set as corresponding to the first light source. If the light intensity value at the center of the circle object in the second image is the largest one among the light intensity values at the centers of the overlapping circle objects, the overlapping circle objects in the first image and the second image are determined to be formed by the second light source, and the circle object in the second image is set as corresponding to the second light source.

With reference to FIG. 5, the first light source 121 radiates red light, and the second light source 131 radiates the blue light, for instance. The first image 510 is the red light image, and the second image 520 is the blue light image. The circle objects C1 and C3 are formed by the same light source, and thereby the light intensity value at each center of the circle objects C1 and C3 is compared to find the center with the maximum light intensity value. This is because the incapability of the color filter 203 for filtering certain light may result in small light intensity values at the centers of the circle objects. Given the light intensity value at the center of the circle object C1 is greater than the light intensity value at the center of the circle object C3, the overlapping circle objects are determined to be formed by the first light source 121, and thus the center of the circle object in the first image has a relatively large light intensity value. In other words, the circle object corresponding to the first light source 121 is the circle object C1; the circle object corresponding to the second light source 131 is the circle object C2.

In step S330 as shown in FIG. 3, after the circle objects corresponding to the first and second light sources 121 and 131 are identified, the 3D coordinates of the first interactive device 120 and the second interactive device 130 relative to the stereo display panel 110 are calculated according to the center coordinate and the radius of each of the circle objects respectively corresponding to the first light source 121 and the second light source 131. For instance, a database can be searched to obtain the height coordinate corresponding to each radius. Specifically, when the radius falls within the range of 0~4 pixels, the corresponding height coordinate is 0 cm; when the radius falls within the range of 4~8 pixels, the corresponding height coordinate is 1 cm, for example. Thereby, the processing unit 140 can calculate the 3D coordinates of the first interactive device 120 and the second interactive device 130 relative to the stereo display panel 110 according to the center coordinate and the height coordinate of each of the circle objects respectively corresponding to the first light source 121 and the second light source 131.

It should be mentioned that the first light source 121 and the second light source 131 can respectively have an orientational pattern, such that an elliptical object having the orientational pattern is formed in the first image or the second image when the first light source 121 or the second light source 131 radiates light to the stereo display panel 110 at a tilt angle. Thereby, the processing unit 140 can determine a tilt direction of the first light source 121 or the second light source 131 according to the orientational pattern and determine the tilt angle according to the elliptical object. For instance, the orientational pattern is an arrow, and the direction in which the light of the first interactive device 120 or the light of the second interactive device 130 is radiated can be determined according to the arrow direction in the elliptical object.

Figure 6A:
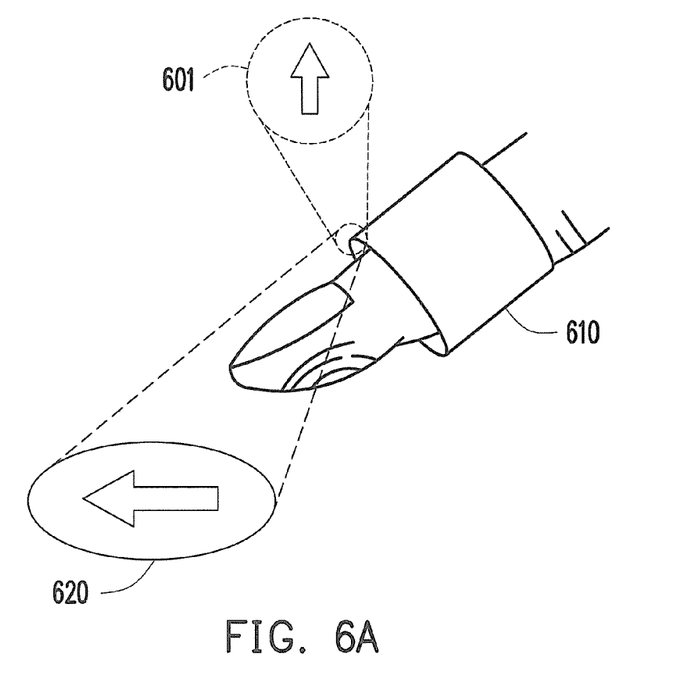
FIG. 6A and FIG. 6B are schematic views illustrating images formed by projection at a tilt angle according to an embodiment.
Figure 6B:
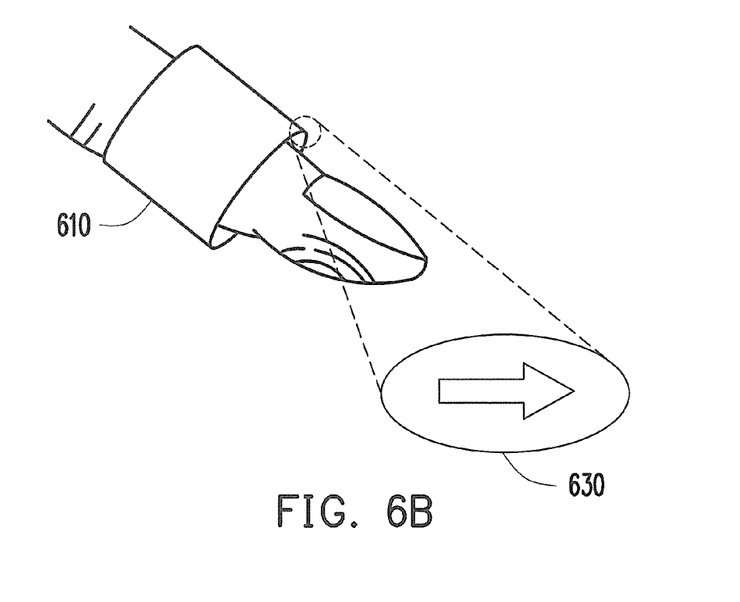

FIG. 6A and FIG. 6B are schematic views illustrating images formed by projection at a tilt angle according to an embodiment. In this embodiment, the interactive device 610 is worn by a user to exemplify the embodiment. Here, the orientational pattern of the light source of the interactive device 610 is an arrow, and the arrow of the light source 601 faces up, for instance. Since the direction of the orientational pattern of the light source of the interactive device 610 remains unchanged, when the finger tilts leftwards, the elliptical object 620 shown in FIG. 6A is formed, and the direction of the arrow is toward the left. When the finger tilts rightwards, the elliptical object 630 shown in FIG. 6B is formed, and the direction of the arrow is toward the right. As such, the light projection direction of the interactive device 610 can be determined according to the direction of the arrow in the elliptical object. To better elaborate the embodiment, the edges of the elliptical objects 620 and 630 are smooth curves. However, practically speaking, the edges of the elliptical objects and the arrow are blurred to some extent.

Figure 7:
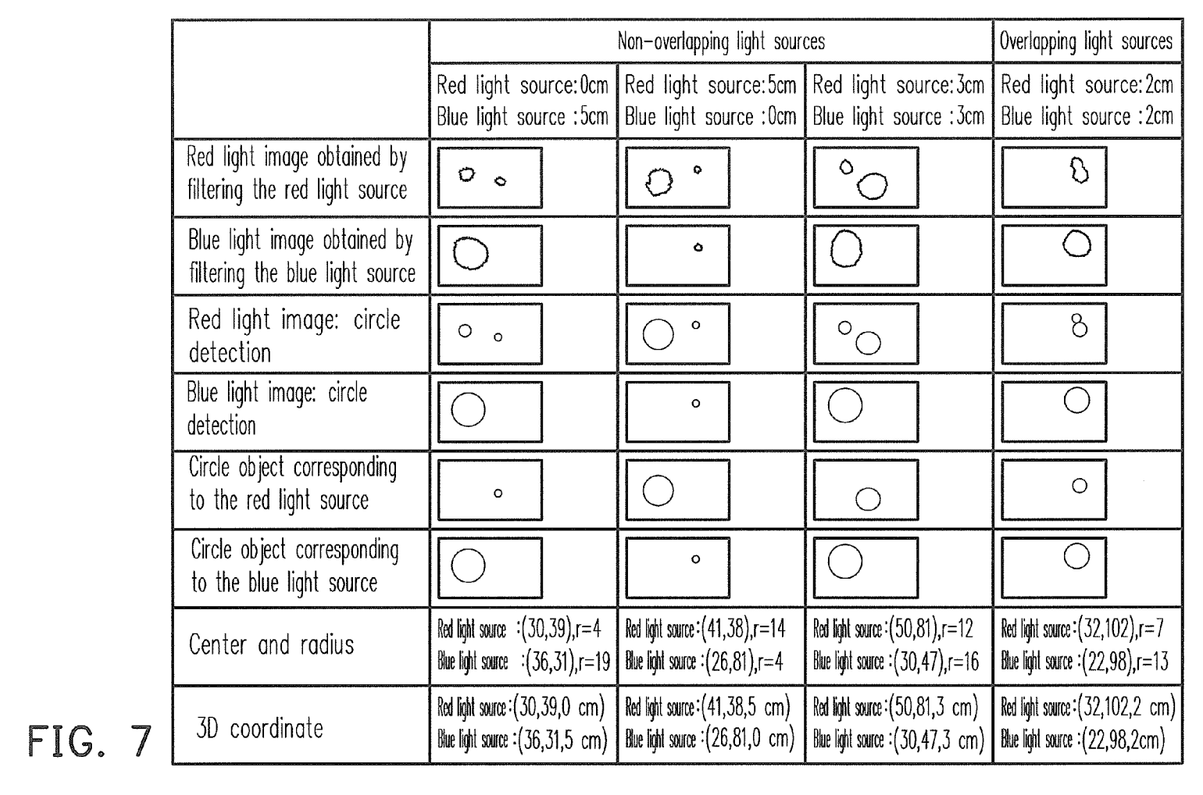
FIG. 7 is a schematic view illustrating experiment results according to an embodiment.

Some experimental results are described hereinafter. FIG. 7 is a schematic view illustrating experimental results according to an embodiment. In FIG. 7, the red light source and the blue light source are taken for example. The detection range of the heights of the red and blue light sources is set within 0 cm~5 cm, and the experiments are conducted under four representative conditions. On the first condition, the distance between the red light source and the stereo display panel is 0 cm, the distance between the blue light source and the stereo display panel is 5 cm, and the red and blue light sources are not overlapped. On the second condition, the distance between the red light source and the stereo display panel is 5 cm, the distance between the blue light source and the stereo display panel is 0 cm, and the red and blue light sources are not overlapped. On the third condition, the distance between the red light source and the stereo display panel is 3 cm, the distance between the blue light source and the stereo display panel is 2 cm, and the red and blue light sources are not overlapped. On the fourth condition, the distance between the red light source and the stereo display panel is 2 cm, the distance between the blue light source and the stereo display panel is 2 cm, and the red and blue light sources are overlapped. The experimental results are shown in FIG. 7.

As shown in FIG. 7, two circle objects are obtained after the circle detection process is performed on each red light image. The center coordinates of the circle objects in the red light image and the blue light image are compared to determine the overlapping circle objects in the red and blue light images, i.e., to detect the circle objects formed by the same light source. According to the light intensity value at the center of each of the circle objects, the light source resulting in the overlapping circle objects in the red light image and the blue light image is determined, and thereby the circle object corresponding to each light source is identified. The 3D coordinate of each light source relative to the stereo display panel is then calculated according to the center coordinate and the radius of each of the circle objects respectively corresponding to the individual light source.

Figure 8:
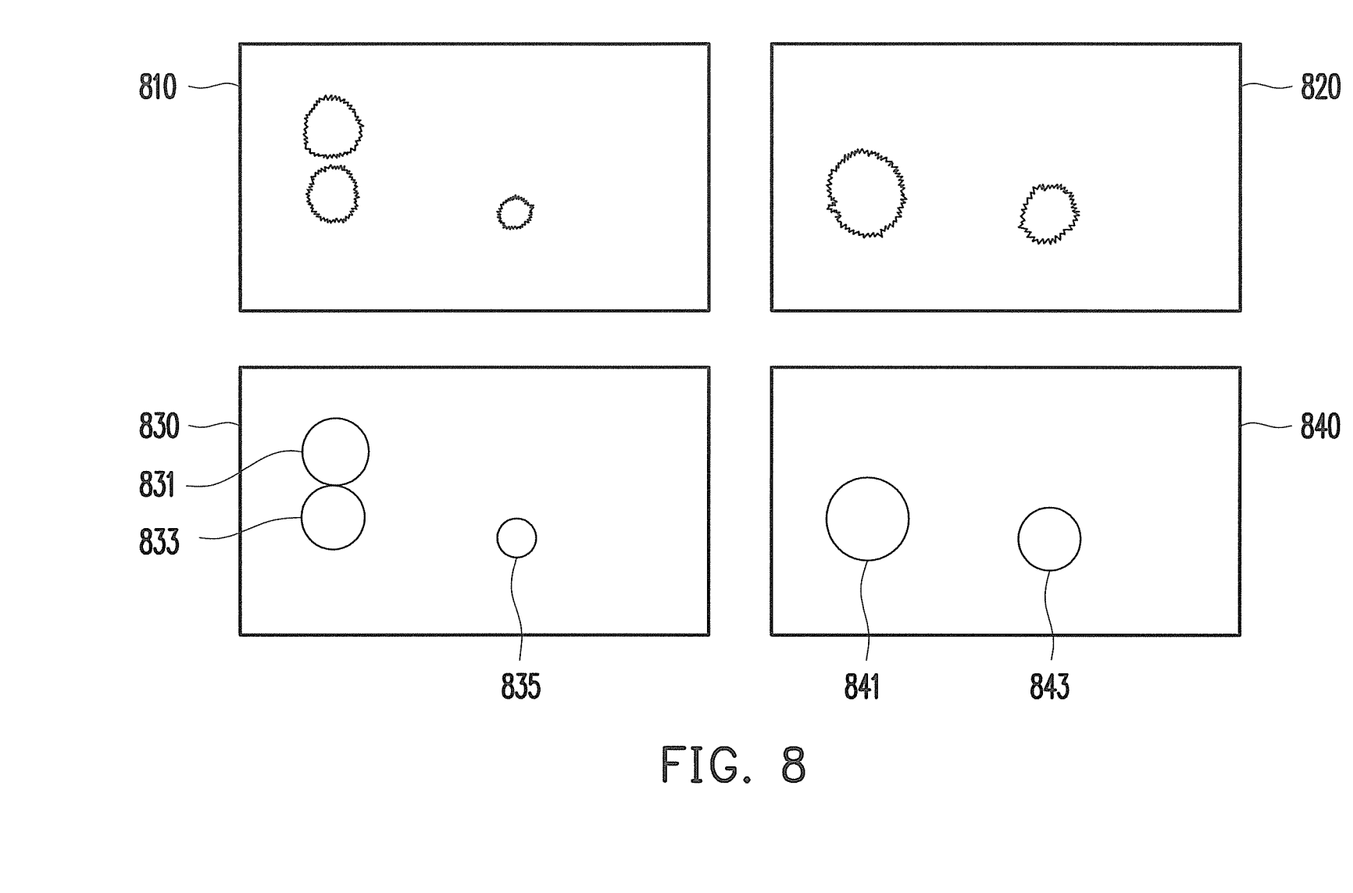
FIG. 8 is a schematic view illustrating identification of the circle object corresponding to each light source according to another embodiment.

FIG. 8 is a schematic view illustrating identification of the circle object corresponding to each light source according to another embodiment. In this embodiment, for instance, the distances between the blue, red, and white light sources and the stereo display panel are 1 cm, 3 cm, and 3 cm, respectively. The image 810 is obtained by the sensing device of the red filter film, and the image 820 is obtained by the sensing device of the blue filter film. The images 830 and 840 are obtained after the circle detection process is performed on the images 810 and 820. In the image 830, the circle objects 831, 833, and 835 are detected. In the image 840, the circle objects 841 and 843 are detected. According to the distances from the circle objects 841 and 843 in the image 840 to the circle objects 831, 833, and 835 in the image 830, it can be determined the circle objects 833 and 841 are formed by the same light source, while the circle objects 835 and 843 are formed by another light source.

Since the circle object 831 merely shows up in the image obtained by the sensing device of the red filter film, the circle object 831 is determined to be formed by the red light source. The light sources respectively corresponding to the other two groups of circle objects can be determined according to the light intensity value at the center of each circle object. For instance, when the difference in the light intensity values between the circle objects 833 and 841 is less than the difference in the light intensity values between the circle objects 835 and 843, it is determined the circle objects 833 and 841 are formed by the white light source, and the circle objects 835 and 843 are formed by the blue light source. Here, the white light source corresponds to one of the circle objects 833 and 841 (e.g., the circle object 841) which has a relatively large light intensity value. Meanwhile, the blue light source corresponds to one of the circle objects 835 and 843 (e.g., the circle object 843) which has a relatively large light intensity value.

In light of the foregoing, as described in the embodiments, the interactive stereo display panel has the color filter and an optical sensor array that is embedded in the interactive stereo display panel, such that different light sources can be applied to interact with the stereo display panel. Thereby, continuous interaction between the light sources and the stereo display panel in a certain distance can be achieved regardless of the dimensions of the panel, and the multi-touch function can be performed without changing the structure and increasing the volume of the stereo display panel. Namely, the stereo display panel is characterized by favorable utility and functionality. Moreover, the circle object corresponding to each light source can be identified, so as to precisely measure the distance between each interactive device and the stereo display panel.

It will be apparent to those skilled in the art that various modifications and variations can be made to the structure without departing from the scope or spirit of the description. In view of the foregoing, it is intended that the invention cover modifications and variations of this invention provided they fall within the scope of the following claims and their equivalents.

What is claimed is:

1. A method for calculating a three-dimensional coordinate, the method being suitable for calculating three-dimensional coordinates of a first interactive device and a second interactive device relative to a stereo display panel, the first interactive device comprising a first light source radiating a first light, the second interactive device comprising a second light source radiating a second light, the stereo display panel comprising a color filter and an optical sensor array, the method comprising:

irradiating the stereo display panel with the first light radiated by the first light source and the second light radiated by the second light source;

obtaining a first image by capturing the first light filtered by the color filter and obtaining a second image by capturing the second light filtered by the color filter, wherein the first light and the second light filtered by the color filter are captured by the optical sensor array;

detecting at least one circle object in the first image and at least one circle object in the second image to obtain a center coordinate and a radius of each of the circle objects in the first image and in the second image, respectively;

determining whether overlapping circle objects among the circle object in the first image and the circle objects in the second image exist according to relative positions of the center coordinates;

detecting a light intensity value at a center of each of the circle objects;

determining the overlapping circle objects among the circle objects in the first image and the circle objects in the second image formed by the first light source or by the second light source according to the light intensity value at the center of each of the circle objects; and calculating the three-dimensional coordinates of the first interactive device and the second interactive device relative to the stereo display panel according to the center coordinate and the radius of each of the circle objects respectively corresponding to the first light source and the second light source.

2. The method as claimed in claim 1, wherein the step of detecting the at least one circle object in the first image and the at least one circle object in the second image comprises:

detecting the at least one circle object in the first image and the at least one circle object in the second image by Hough transformation to obtain the center coordinate and the radius of each of the circle objects in the first image and in the second image, respectively.

3. The method as claimed in claim 1, wherein when the first image comprises a first circle object, and the second image comprises a second circle object and a third circle object, the step of determining whether the overlapping circle objects among the circle object in the first image and the circle object in the second image exist further comprises:

calculating a first distance between the first circle object and the second circle object and a second distance between the first circle object and the third circle object according to the center coordinate of each of the circle objects;

confirming the first circle object and the second circle object are overlapped if the first distance is shorter than the second distance; and confirming the first circle object and the third circle object are overlapped if the second distance is shorter than the first distance.

4. The method as claimed in claim 1, wherein the step of determining the overlapping circle objects among the circle object in the first image and the circle object in the second image are formed by the first light source or by the second light source according to the light intensity value at the center of each of the circle objects further comprises:

confirming the overlapping circle objects are formed by the first light source if the largest light intensity value among the light intensity values of the overlapping circle objects is detected at the center of the circle object in the first image and setting the circle object in the first image as corresponding to the first light source; and confirming the overlapping circle objects are formed by the second light source if the largest light intensity value among the light intensity values of the overlapping circle objects is detected at the center of the circle object in the second image and setting the circle object in the second image as corresponding to the second light source.

5. The method as claimed in claim 1, wherein the step of calculating the three-dimensional coordinates of the first interactive device and the second interactive device relative to the stereo display panel according to the center coordinate and the radius of each of the circle objects respectively corresponding to the first light source and the second light source comprises:

searching a database according to the radius of each of the circle objects respectively corresponding to the first light source and the second light source to obtain a height coordinate corresponding to the radius, and generating the three-dimensional coordinates of the first interactive device and the second interactive device relative to the stereo display panel according to the center coordinate and the height coordinate of each of the circle objects respectively corresponding to the first light source and the second light source.

6. An interactive stereo display system comprising:

a first interactive device comprising a first light source radiating a first light;

a second interactive device comprising a second light source radiating a second light;

a stereo display panel comprising a color filter and an optical sensor array, wherein the optical sensor array captures the first light filtered by the color filter to obtain a first image and captures the second light filtered by the color filter to obtain a second image when the stereo display panel is irradiated by the first light radiated from the first light source and the second light radiated from the second light source; and a processing unit electrically connected to the optical sensor array for receiving the first image and the second image from the optical sensor array, respectively, detecting at least one circle object in the first image and at least one circle object in the second image to obtain a center coordinate and a radius of each of the circle objects in the first image and in the second image, respectively, determining whether overlapping circle objects among the circle objects in the first image and the circle objects in the second image exist according to relative positions of the center coordinates, detecting a light intensity value at a center of each of the circle objects, determining the overlapping circle objects of the circle objects in the first image and the second image are formed by the first light source or by the second light source according to the light intensity value at the center of each of the circle objects, and calculating three-dimensional coordinates of the first interactive device and the second interactive device relative to the stereo display panel according to the center coordinate and the radius of each of the circle objects respectively corresponding to the first light source and the second light source.

7. The interactive stereo display system as claimed in claim 6, wherein the processing unit detects the at least one circle object in the first image and the at least one circle object in the second image by Hough transformation to obtain the center coordinate and the radius of each of the circle objects in the first image and the second image.

8. The interactive stereo display system as claimed in claim 6, wherein the processing unit determines whether the overlapping circle objects exist according to relative positions of the center coordinates of the circle objects.

9. The interactive stereo display system as claimed in claim 6, the processing unit compares the light intensity values at the centers of the overlapping circle objects, confirms the overlapping circle objects are formed by the first light source if the light intensity value at the center of the circle object in the first image is the largest one among the light intensity values at the centers of the overlapping circle objects and setting the circle object in the first image as corresponding to the first light source, and confirms the overlapping circle objects are formed by the second light source if the light intensity value at the center of the circle object in the second image is the largest one among the light intensity values at the centers of the overlapping circle objects and setting the circle object in the second image as corresponding to the second light source.

10. The interactive stereo display system as claimed in claim 6, wherein the processing unit searches a database according to the radius of each of the circle objects respectively corresponding to the first light source and the second light source to obtain a height coordinate corresponding to the radius, and the processing unit generates the three-dimensional coordinates of the first interactive device and the second interactive device relative to the stereo display panel according to the center coordinate and the height coordinate of each of the circle objects respectively corresponding to the first light source and the second light source.

11. The interactive stereo display system as claimed in claim 6, wherein the first light source and the second light source are light emitting diodes.

12. The interactive stereo display system as claimed in claim 6, wherein the first light source and the second light source respectively have an orientational pattern, and an elliptical object having the orientational pattern is formed in the first image or the second image when the first light source or the second light source radiates light to the stereo display panel at a tilt angle, the processing unit determines a tilt direction of the first light source or the second light source according to the orientational pattern and determines the tilt angle according to the elliptical object.

13. The interactive stereo display system as claimed in claim 6, wherein the processing unit is built in the stereo display panel.

14. The interactive stereo display system as claimed in claim 6, wherein the first light source and the second light source have different light wavelengths.

15. The interactive stereo display system as claimed in claim 14, wherein the first light is red light and the second light is blue light.

* * * * *